(12) United States Patent
Wang (10) Patent No.: US 12,302,254 B2
(45) Date of Patent: May 13, 2025

(54) METHODS, TERMINAL DEVICE, AND APPARATUSES FOR UPLINK POWER CONTROL AND RECEIVING

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/585,288

(22) Filed: Sep. 27, 2019

(65) Prior Publication Data

US 2020/0029281 A1 Jan. 23, 2020

Related U.S. Application Data

(63) Continuation of application No. PCT/CN2017/079049, filed on Mar. 31, 2017.

(51) Int. Cl.
*H04W 52/14* (2009.01)
*H04W 52/36* (2009.01)
(Continued)

(52) U.S. Cl.
CPC ......... *H04W 52/146* (2013.01); *H04W 52/36* (2013.01); *H04W 72/0446* (2013.01); *H04W 76/15* (2018.02)

(58) Field of Classification Search
CPC ............. H04W 52/367; H04W 52/146; H04W 52/346; H04W 72/0473
See application file for complete search history.

(56) References Cited

U.S. PATENT DOCUMENTS

| 10,313,980 | B2 * | 6/2019 | Kim | H04W 52/24 |
| 10,575,149 | B2 * | 2/2020 | Wu | H04W 72/121 |

(Continued)

FOREIGN PATENT DOCUMENTS

| CN | 103210695 A | 7/2013 |
| CN | 105580451 A | 5/2016 |

(Continued)

OTHER PUBLICATIONS

Communication dated Aug. 25, 2020, issued by the Japanese Patent Office in application No. 2019-553520.

(Continued)

*Primary Examiner* — Sithu Ko
(74) *Attorney, Agent, or Firm* — Sughrue Mion, PLLC (57) ABSTRACT

Embodiments of the present disclosure relate to a method, terminal device and apparatus for uplink power control, a method, network element and apparatus for uplink receiving, and a method, network element and apparatus for transmitting information on uplink transmission power. The terminal device is connected to both a first wireless communication system and a second wireless communication system. Uplink transmission power for respective power adjustment zones within a subframe in the first wireless communication system can be determined based on a type of transmission within corresponding parts of a related subframe in the second wireless communication system. With embodiments of the present disclosure, the uplink transmission power can be determined based on the type of transmission in the second wireless communication systems, transmission power can be used in an efficient way and thus power efficiency can be improved.

4 Claims, 7 Drawing Sheets

NR uplink symobls

NR downlink symobls

LTE uplink symobls (51) Int. Cl.
*H04W 72/0446* (2023.01)
*H04W 76/15* (2018.01)

(56) References Cited

U.S. PATENT DOCUMENTS

| | | | | |
|---|---|---|---|---|
| 10,588,093 | B2* | 3/2020 | Feuersaenger | H04W 52/325 |
| 11,044,650 | B2* | 6/2021 | Chen | H04W 76/27 |
| 11,089,552 | B2* | 8/2021 | Wang | H04W 52/38 |
| 2009/0318183 | A1 | 12/2009 | Hugl et al. | |
| 2015/0201383 | A1* | 7/2015 | Papasakellariou | H04W 52/146 370/278 |
| 2018/0279274 | A1* | 9/2018 | Sun | H04W 52/367 |
| 2018/0279339 | A1* | 9/2018 | Lohr | H04W 52/365 |
| 2018/0295585 | A1* | 10/2018 | Hwang | H04W 52/288 |
| 2019/0090218 | A1* | 3/2019 | Noh | H04W 72/51 |
| 2019/0132803 | A1* | 5/2019 | Kim | H04W 52/14 |

FOREIGN PATENT DOCUMENTS

| | | | |
|---|---|---|---|
| CN | 105917709 | A | 8/2016 |
| CN | 105934980 | A | 9/2016 |
| CN | 105940733 | A | 9/2016 |
| CN | 105960818 | A | 9/2016 |
| CN | 106031256 | A | 10/2016 |
| CN | 106537996 | A | 3/2017 |
| JP | 2016-40918 | A | 3/2016 |
| JP | 2017-505575 | A | 2/2017 |
| WO | 2015139224 | A1 | 9/2015 |
| WO | 2016/021588 | A1 | 2/2016 |
| WO | 2017033490 | A1 | 3/2017 |
| WO | WO-2017171953 | A1 * | 10/2017 ........... H04B 7/0617 |

OTHER PUBLICATIONS

InterDigital Communications, "Uplink power sharing in NR", 3GPP TSG RAN WG1 Meeting #88, R1-1702381, Athens, Greece, Feb. 13-17, 2017, 5 pages total.
"ETRI Uplink power control in dual connectivity", 3GPP TSG RAN WGI Meeting #77, R1-142210, sections 1-3, May 23, 2014.
International Search Report of PCT/CN2017/079049 dated Nov. 24, 2017[PCT/ISA/210].
Written Opinion of PCT/CN2017/079049 dated Nov. 24, 2017[PCT/ISA/237].
Ericsson, "UL Power control in dual connectivity" 3GPP TSG RAN WG1 Meeting #76, Mar. 31-Apr. 4, 2014, R1-141645 (total 5 pages).
Huawei et al., "Uplink Power allocation in Dual connectivity", 3GPP TSG RAN WG1 Meeting #76bis, Mar. 31-Apr. 4, 2014, R1-141134 (total 4 pages).
Communication dated Mar. 9, 2020 from European Patent Office in EP Application No. 17903905.2.
Communication issued Sep. 24, 2020 by the Patent Office of The People's Republic of China in application No. 201780089243.9.

* cited by examiner

METHODS, TERMINAL DEVICE, AND APPARATUSES FOR UPLINK POWER CONTROL AND RECEIVING

CROSS REFERENCE TO RELATED APPLICATIONS

This application is a continuation of International Application No. PCT/CN2017/079049, filed Mar. 31, 2017.

FIELD OF THE INVENTION

The non-limiting and exemplary embodiments of the present disclosure generally relate to the field of wireless communication techniques, and more particularly relate to a method, terminal device and apparatus for uplink power control, a method, network element and apparatus for uplink receiving, and a method, network element and apparatus for transmitting information on uplink transmission power.

BACKGROUND OF THE INVENTION

In order to improve data rate performance, it was proposed in Rel. 12 of the third generation Partnership Project (3GPP) Long Term Evolution-Advanced (LTE-A) to use dual connectivity (DC) when master eNB (MeNB) does not connect to secondary eNB (SeNB) with an ideal backhaul.

In Radio Access Network (RAN) #78b meeting for the 3GPP working group, two power control modes were defined for the DC i.e., DC power control mode 1 and DC power control mode 2. The DC power control mode 1 is used for synchronous dual connectivity, wherein all remaining power beside the guaranteed power is shared and the priority can be determined based on (Uplink Control Information) UCI type across cell groups (CG) for the remaining power. The DC power control mode 2 is used for asynchronous dual connectivity, wherein power P_SeNB and/or P_MeNB will be reserved towards each eNB if there is potential uplink transmission and all remaining power is first made available to CG associated with earlier transmission. In addition, a higher layer signaling "powerControlMode" will be used to indicate which dual connective power mode is to be used.

For illustrative purposes, references will be made to FIGS. 1 and 2 to describe the two power control modes, wherein FIGS. 1 and 2 respectively illustrate solutions of DC power control for synchronous dual connectivity and asynchronous dual connectivity in 3GPP Rel-12.

Figure 1:
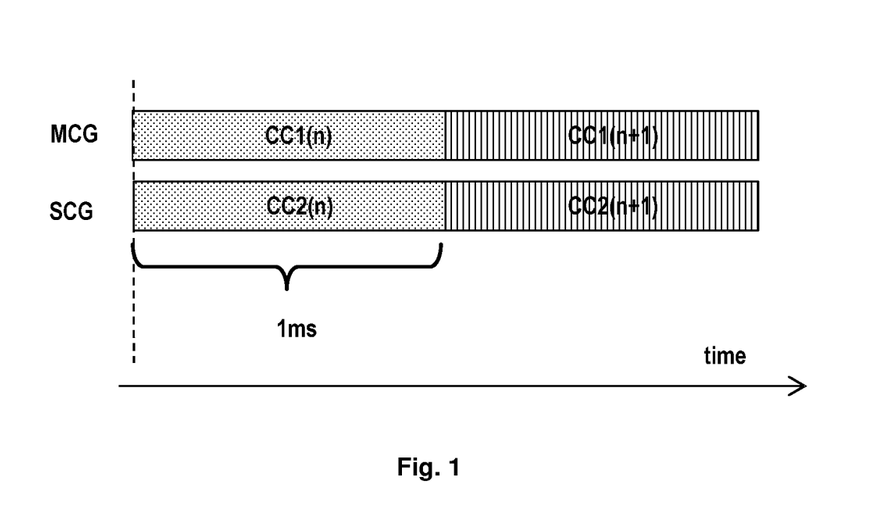
FIG. 1 schematically illustrates a solution of DC power control for synchronous dual connectivity in 3GPP Rel-12.

FIG. 1 illustrates a solution of DC power control for synchronous dual connectivity in 3GPP Rel-12. As illustrated in FIG. 1, in Master Cell Group (MCG) and Secondary Cell Group (SCG), the terminal device will transmit signals in a synchronous dual connectivity. In power control mode 1 (PCM1), the following schemes are assumed with regards to PRACH prioritization across CGs:

In power control mode 1 (PCM1), if two PRACHs collide, two PRACHs are intended to start at the same subframe, or a PRACH overlaps with other channels, the priority for power allocation can be determined as:

PCell PRACH>other PRACHs>other channels

In PCM1, dynamic power sharing is supported for SRS,
The maximum power of CG in the last symbol containing Sounding Reference Signal (SRS) is above the guaranteed power;
The same power allocation principle as that for Physical Uplink Control Channel/Physical Uplink Shared Channel (PUCCH/PUSCH) is used for SRS in the last symbol, but power allocation between CG's may be different in the last symbol.

Figure 2:
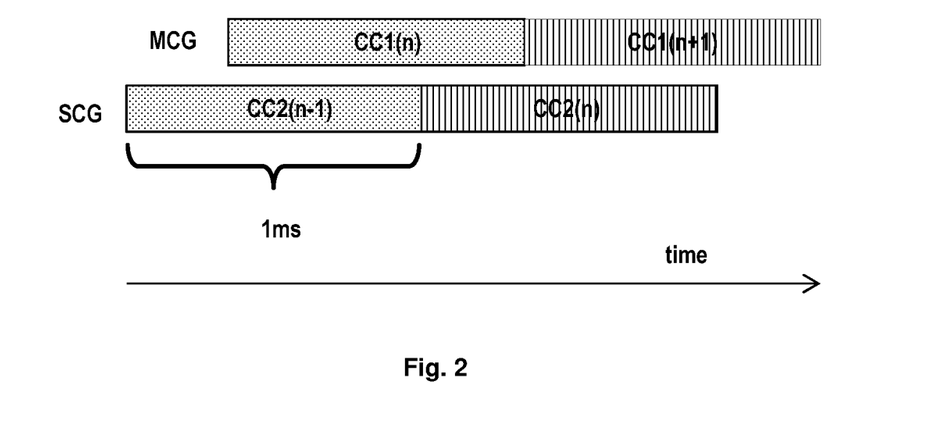
FIG. 2 schematically illustrates a solution of DC power control for asynchronous dual connectivity in 3GPP Rel-12.

FIG. 2 schematically illustrates a solution of DC power control for asynchronous dual connectivity in 3GPP Rel-12. As illustrated in FIG. 2, in MCG and SCG, the terminal device will transmit signals in asynchronous dual connectivity. That is to say, in PCM2, two PRACHs collide but the difference of the starting time of two PRACH transmissions is less than 1 ms, or a PRACH overlap with other channels. In such a case, the following schemes are assumed with regards to PRACH prioritization across CGs:

when prioritized PRACH is transmitted at least one subframe after the subframe in which the UE shall be ready to transmit a preamble according to 36.213 section 6.1.1, the priority for power allocation is determined as PCell PRACH>other PRACHs>other channel Otherwise, on-going transmission is prioritized For power allocation for SRS in PCM2, power per CG is computed at a subframe-boundary. The SRS power is accounted for the total power per CG, and CG associated with earlier timing will get the higher priority.

Thus, when to decide the transmission power of CC1($n$), UE only needs to consider the power of CC2($n-1$), guarantee power of CC2($n-1$) and power of PRACH on CC2($n$).

Recently, new radio access system was proposed to further improve user throughput. The new radio access system can be called as new RAT/NR system or network for short, and is considered as the next generation communication (5G) system. In Radio Access Network (RAN) #71 meeting for the third generation Partnership Project (3GPP) working group, study of NR system was approved. The NR system will consider frequency ranging up to 100 Ghz with an object of a single technical framework addressing all usage scenarios, requirements and deployment scenarios defined in Technical Report TR 38.913, which include requirements such as enhanced mobile broadband, massive machine-type communications, ultra reliable and low latency communications.

Particularly, in RP-170855, the following work items on new radio access technical were proposed:
Dual Connectivity between Evolved Universal Terrestrial Radio Access (E-UTRA) and NR, for which the priority is where E-UTRA is the master and the second priority is where NR is the master, and Dual Connectivity within NR, including:
Standardizing bearer types recommended in TR 38.804 [RAN2];
Necessary physical layer mechanisms including UL power control [RAN1];
Identify band combinations and corresponding requirements [RAN4].

In addition, in NR study item TR 38.802, it was proposed that NR shall support multiple numerologies. A numerology is defined by sub-carrier spacing and CP overhead. Multiple subcarrier spacings can be derived by scaling a basic sub-carrier spacing by an integer N. In the NR system, the subframe duration is fixed to 1 ms, while a slot is defined as 7 or 14 OFDM symbols for the same subcarrier spacing of up to 60 kHz with normal CP, and defined as 14 OFDM symbols for the same subcarrier spacing higher than 60 kHz with normal CP. Moreover, a slot can contain only downlink symbols, only uplink symbols, or at least one downlink part and at least one uplink part. Besides, slot aggregation is supported, in other words, data transmission can be scheduled to span one or multiple slots.

Thus, it can be seen there are differences between the NR and E-UTRA systems. Thus, solutions for DC therebetween are required to improve, for example for the sake of power efficiency, etc.

SUMMARY OF THE INVENTION

To this end, in the present disclosure, there is provided a new solution for uplink power control in DC between two different wireless communication system, to mitigate or at least alleviate at least part of the issues in the prior art.

According to a first aspect of the present disclosure, there is provided a method of uplink power control at a terminal device. The terminal device is connected to both a first wireless communication system and a second wireless communication system. The method may comprise determining uplink transmission power for respective power adjustment zones within a subframe in the first wireless communication system, based on a type of transmission within corresponding parts of a related subframe in the second wireless communication system.

According to a second aspect of the present disclosure, there is provided a method of uplink receiving at a first wireless communication system. A terminal device to be served can be connected to both the first wireless communication system and a second wireless communication system. The method may comprise obtaining information on uplink transmission power for respectively power adjustment zones within a subframe in the first wireless communication system, to receive uplink signals within the subframe using power indicated by the information on uplink transmission power.

According to a second aspect of the present disclosure, there is provided a method of transmitting uplink transmission power information for a first wireless communication system at a second wireless communication system. A terminal device to be served can be connected to both the first wireless communication system and a second wireless communication system. The method can comprise transmitting the information on uplink transmission power for respective power adjustment zones within a subframe in the first wireless communication system to the first wireless communication system.

According to a fourth aspect of the present disclosure, there is provided a terminal device, wherein the terminal device to be served is connected to both a first wireless communication system and a second wireless communication system. The terminal device may comprise: a transceiver configured to transmit and/or receive signals; and a controller, configured to determine uplink transmission power for respective power adjustment zones within a subframe in the first wireless communication system, based on a type of transmission within corresponding parts of a related subframe in the second wireless communication system.

According to a fifth aspect of the present disclosure, there is provided network node in a first wireless communication system. A terminal device to be served is connected to both the first wireless communication system and a second wireless communication system. The network node may comprise a transceiver configured to transmit and/or receive signals and a controller configured to obtain information on uplink transmission power for respectively power adjustment zones within a subframe in the first wireless communication system, to control the transceiver to receive uplink signals within the subframe using power indicated by the information on uplink transmission power.

According to a sixth aspect of the present disclosure, there is provided a network node in a second wireless communication system. A terminal device to be severed is connected to both a first wireless communication system and the second wireless communication system. The network node may comprise a transceiver configured to transmit and/or receive signals and a controller configured to control the transceiver to transmit the information on uplink transmission power for respective power adjustment zones within a subframe in the first wireless communication system.

According to a seven aspect of the present disclosure, there is provided a computer-readable storage media with computer program code embodied thereon, the computer program code configured to, when executed, cause an apparatus to perform actions in the method according to any embodiment in the first aspect.

According to an eighth aspect of the present disclosure, there is provided a computer-readable storage media with computer program code embodied thereon, the computer program code configured to, when executed, cause an apparatus to perform actions in the method according to any embodiment in the second aspect.

According to a ninth aspect of the present disclosure, there is provided a computer-readable storage media with computer program code embodied thereon, the computer program code configured to, when executed, cause an apparatus to perform actions in the method according to any embodiment in the third aspect.

According to a tenth aspect of the present disclosure, there is provided a computer program product comprising a computer-readable storage media according to the seventh aspect.

According to an eleventh aspect of the present disclosure, there is provided a computer program product comprising a computer-readable storage media according to the eighth aspect.

According to a twelfth aspect of the present disclosure, there is provided a computer program product comprising a computer-readable storage media according to the ninth aspect.

With embodiments of the present disclosure, the uplink transmission power can be determined based on the type of transmission in the second wireless communication systems, transmission power can be used in an efficient way and thus power efficiency can be improved.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (Node B in NR system), a radio header (RH), a remote radio head (RRH), a relay, or a low power node such as a femto, a pico, and so on.

As already mentioned, in the NR system, a slot may contain only downlink symbols, only uplink symbols, or at least one uplink part and at least one downlink part, which is dependent on traffic transmission requirements. This is different from the subframe structure in the LTE system. Inventor noticed that there was a potential power inefficiency issues in a case of DC between the LTE system and the NR system, which will be described with reference to FIG. 3.

Figure 3:
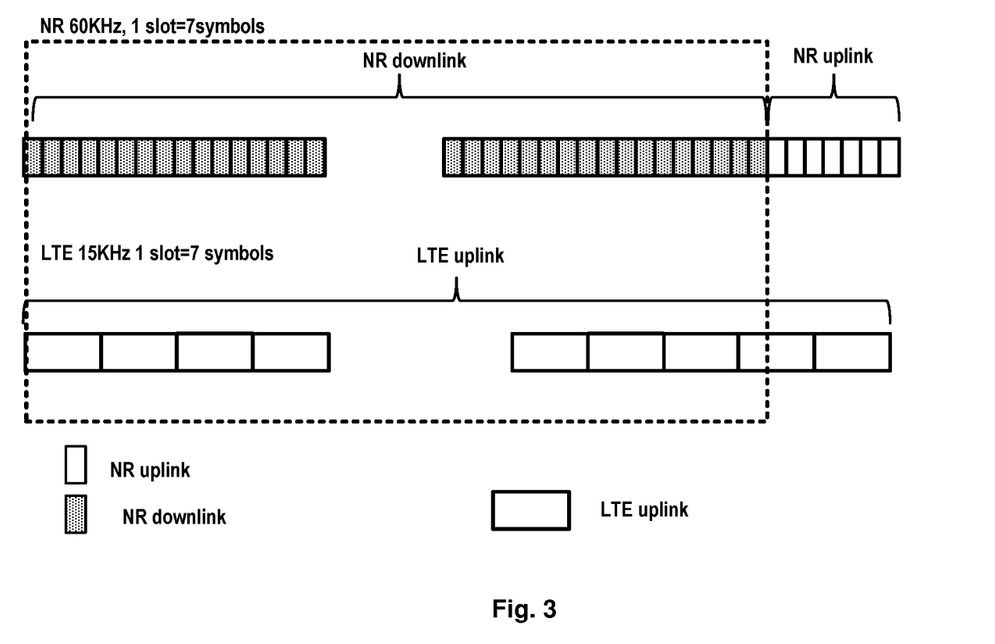
FIG. 3 illustrates a scenario of DC between the LTE system and the NR system.

FIG. 3 illustrates a scenario of DC between the LTE system and the NR system wherein eNBs in the LTE system is supposed as MCG and gNBs in the NR system is supposed as SCG. As illustrated in FIG. 3, in the LTE system, there is only uplink transmission in the subframe, while in the NR system, there are both downlink transmission and uplink transmission for the LTE uplink subframe. In such a case, if the guarantee uplink power of SCG is $P_{\_SCG}$, then the maximum uplink transmission power for LTE system will be Pmax−$P_{\_SCG}$. Thus, the maximum transmission power of LTE uplink is just 50% if the guarantee uplink power $P_{\_SCG}$ for the NR system accounts for 50% of the total available transmission power. However, in the NR system, only several symbols are for uplink transmission and the downlink transmission will not use the guarantee power, which means an uplink transmission power waste and it is inefficient.

In order to address the above problem, in the present disclosure, it is proposed to further divide the LTE subframe into several power adjustment zones, and power control can be performed on each zone independently. For illustrative purposes, reference will be made to FIG. 4 to describe the propose solution in brief, wherein FIG. 4 schematically illustrates a diagram of example power adjustment zone splitting according to an embodiment of the present disclosure.

Figure 4:
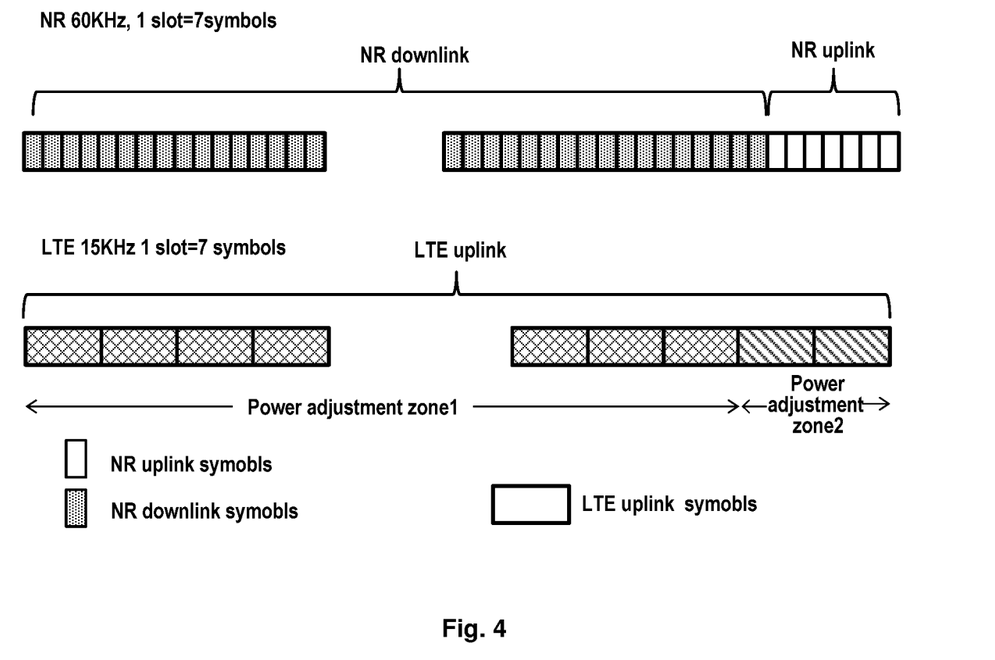
FIG. 4 schematically illustrates a diagram of power adjustment zone splitting according to an embodiment of the present disclosure.

As illustrated in FIG. 4, different from the existing solution, the subframe is further divided into two power adjustment zones in which uplink transmission power can be controlled separately. The power adjustment zone 1 contains those symbols not overlapping with NR uplink transmission while the power adjustment zone 2 contains symbols at least partially overlapping with the NR uplink symbols. Thus, it is clear that the division is closely dependent on the type or type change of transmission in the NR system. By means of such dividing, it is possible to perform uplink power control in an efficiency way, for example, making full use of power when there is no uplink transmission in NR system. For example, in power adjustment zone 1, there is no uplink power in NR subcarriers, so all transmission power can be allocated to the LTE subcarriers; on the other hand, in power adjustment zone 2, there will be overlapping transmissions among LTE and NR carriers and thus the existing power control rules of LTE DC can be applied. However, it shall be noticed that it is only an example scenario to explain the idea of the present disclosure and the present disclosure is not limited thereto. From the teaching herein, the skilled in the art can readily know the division when there are more uplink transmission segments and downlink transmission segments.

Figure 5:
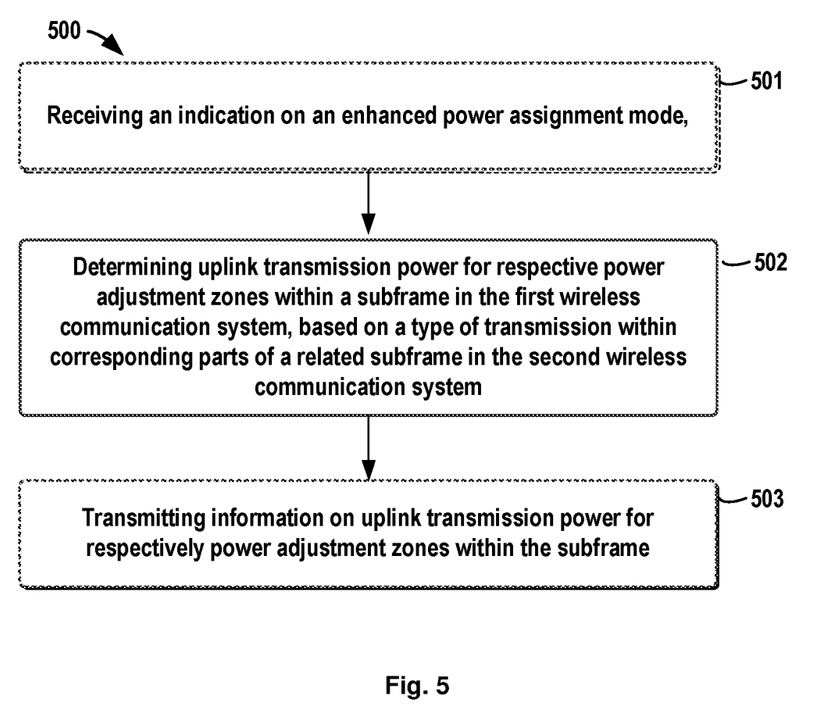
FIG. 5 schematically illustrates a flow chart of a method of uplink power control at a terminal device according to an embodiment of the present disclosure.

Hereinafter, reference will be further made to FIGS. 5 to 15 to describe the power control solution as proposed in the present disclosure in details. It shall be appreciated that all embodiments are given for illustrative purposes and the present disclosure is not limited thereto. In the embodiments described hereinbelow, the LTE system will be taken as a first wireless communication system using the uplink power control solution and the NR system will be taken as an example facilitating the uplink power control solution; however, the skilled in the art can understand that the present disclosure is not limited thereto, it can also apply to other DC between different wireless communication systems with similar issues. In addition, the CGs are classified as MCG and SCG, such a classification is used only for explanation purposes, the classification can be changed or omitted. In addition, gNBs in the NR system will be considered as the example of SCG, and eNBs in the LTE system will be considered as the example of MCG FIG. 5 schematically illustrates a flow chart of a method 500 of uplink power control at a terminal device according to an embodiment of the present disclosure. The method 500 can be performed at a terminal device, for example UE, or other like terminal devices. The terminal device can be connected to both a first wireless communication system and a second wireless communication system Hereinafter, the LTE system will be taken as an example of the first communication system and the NR system will be taken as an example of the second communication system, but the present disclosure is not limited thereto.

As illustrated in FIG. 5, first in the optional step 501, the terminal device may receive an indication on an enhanced power control mode. The enhanced power control mode used herein refers to the power control solution as proposed herein. The indication on an enhanced power control mode can be transmitted from the first wireless communication system to enable the power control solution as proposed herein.

Figure 6:
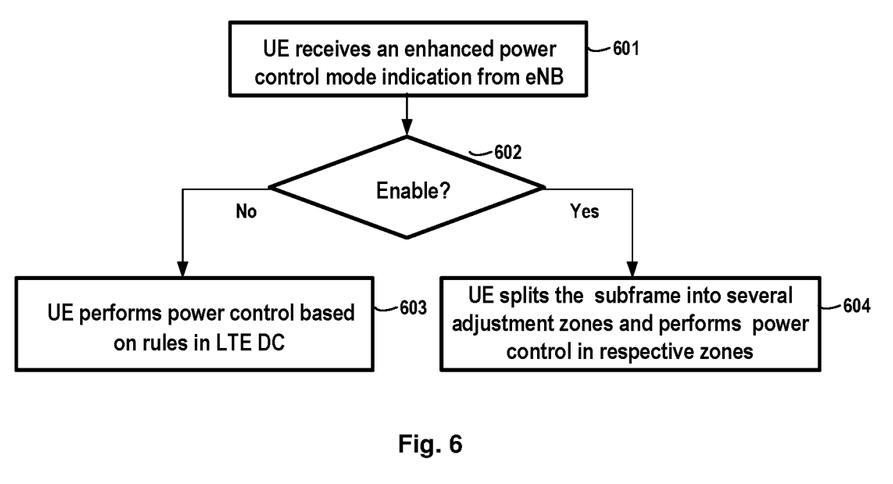
FIG. 6 illustrates a flow chart of enhanced power control mode indication receiving process according to an embodiment of the present disclosure.

For illustrative purposes, FIG. 6 illustrates a flow chart of enhanced power control mode indication receiving process on a power control mode according to an embodiment of the present disclosure. As illustrated in FIG. 6, UE receives an enhanced power control mode indication from eNB in the LTE system at step 601. At step 602, the UE determines whether to enable the enhanced power control mode based on the indication. If No, at step 603, the UE performs the power control based on the existing rules in LTE DC; otherwise (Yes), at step 604, the UE splits the subframe into several adjustment zones and perform UL power control in respective adjustment zones.

However, it shall be appreciated that FIG. 6 is given just for illustrative purpose and the present disclosure is not limited thereto. For example, it may always perform the enhanced power control if only DC between the LTE system and the NR system is supported, and no further indication is required. In addition, the enhanced power control mode indication can also be an enable indication for the enhanced power control mode and the UE can enable the enhanced power control mode upon receipt of the indication and disable the enhanced power control mode in the absence of such an indication.

Reference is made back to FIG. 5, and at step 502, the UE determines the uplink transmission power for respective power adjustment zones within a subframe in the first wireless communication system, based on a type of transmission within corresponding parts of a related subframe in the second wireless communication system. Herein the term "type of transmission" means the transmission is uplink transmission or downlink transmission. The uplink transmission power for respective power adjustment zones within a subframe in for example the LTE system can be determined by means of the type of transmission within corresponding parts of a related subframe in the NR system.

For illustrative purposes, reference can be made back to FIG. 4, wherein the subframe of LTE is divided into power adjustment zone 1 and power adjustment zone 2 based on the type of transmission within corresponding parts of a related subframe in the NR system. For the power adjustment zone 1, there is no uplink transmission in the corresponding parts within the related subframe of the NR system, the uplink transmission power can be determined as the transmission power available for the LTE system and the NR system, for example, determined as the total transmission power at the UE.

The type of transmission within corresponding parts of a related subframe in the second wireless communication system can be obtained from the structure of related subframe in the second wireless communication system. The subframe structure may indicate the downlink and the uplink symbols within a subframe, which can be used to derive the type of transmission within a subframe. The subframe structure can be indicated by the NR system, by for example Radio Resource Control (RRC) signaling, Media Access Control (MAC) control elements, or DCI indication. Additionally or alternatively, the type of transmission can also be obtained from the scheduling information for the UE in the second wireless communication system. From the scheduling information, it can learn the type of transmission to be scheduled within the subframe and thus it can be used to derive the type of transmission within a subframe as well.

In an embodiment of the present disclosure, the UE monitors the type of transmission within corresponding parts of the related subframe in the second wireless communication system all the time. In another embodiment of the present disclosure, the UE obtains the type of transmission at a slot start or end boundary within the related subframe in the second wireless communication system. In another embodiment of the present disclosure, the UE obtains the type of transmission at a symbol start or end boundary within the related subframe in the second wireless communication system.

In another embodiment of the present disclosure, the uplink transmission power for respective power adjustment zones can be determined in response to a change of the type of transmission within corresponding parts of the related subframe in the second wireless communication system. If the type of transmission is not changed, the uplink transmission power can be maintained.

In order to enable the network node (such as eNB) in the first wireless communication system to decode the uplink transmission efficiently, the first wireless communication system like the LTE system needs to know the information on uplink transmission power. Thus, in step 503, the UE may transmit the information on uplink transmission power for respectively power adjustment zones within the subframe to the network node.

Figure 7:
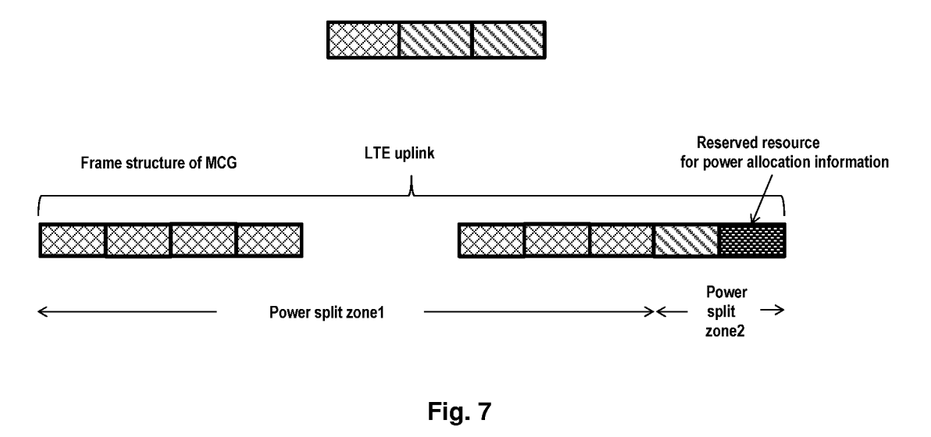
FIG. 7 schematically illustrates reserved resource for signaling information on uplink transmission power according to an embodiment of the present disclosure.

In an embodiment of the present disclosure, the UE may reserve some resource for the signaling for information on uplink transmission power, for example reserving the last symbol within a subframe, as illustrated in FIG. 7. As an alternative option, the UE may also reuse SRS resource to signal information on uplink transmission power, back to the first wireless communication system.

The information on uplink transmission power may include for example symbol numbers in respective power adjustment zones, and power information in respective power adjustment zones or power differences among respective power adjustment zones. For example, zone 1={0, 1, 2 . . . 11}, zone 2={12, 13}, and power difference=3 dB.

As another alternative embodiment of the present disclosure, the UE may not inform the information on uplink transmission power; instead, the UE may limit its modulation mode to for example QPSK. In such a case, the amplitude change does not affect the performance of demodulation at the eNB.

Next, references will be made to FIG. 8 to describe the solution of uplink receiving at a first wireless communication system, like eNB in the LTE system.

Figure 8:
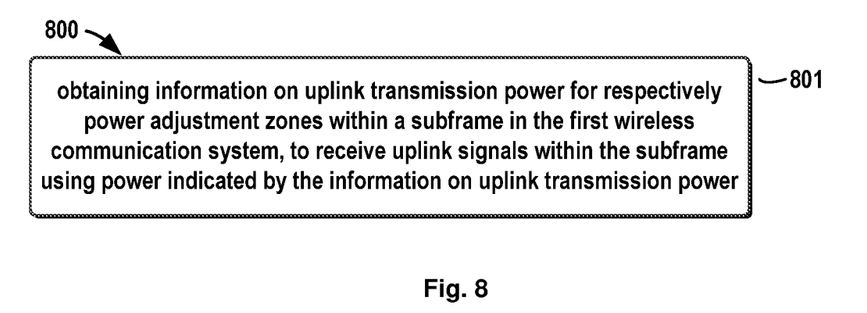
FIG. 8 schematically illustrates a flow chart of a method of uplink receiving at a first wireless communication system according to an embodiment of the present disclosure.

As illustrated in FIG. 8, at step 801, the eNB obtains information on uplink transmission power for respectively power adjustment zones within a subframe in the first wireless communication system, to receive uplink signals within the subframe using power indicated by the information on uplink transmission power. The eNB can use the information on uplink transmission power to decode the uplink transmission from the UE.

As mentioned the terminal device, the terminal device like UE can transmit the information on uplink transmission power, and in such case, the information on uplink transmission power can be received from the terminal device.

As another embodiment of the present disclosure, the information on uplink transmission power can be received from the second wireless communication system such as the NR system. In such a case, the information on uplink transmission power may comprise at least one of a structure of a related subframe and uplink scheduling information within the related subframe in the second wireless communication system. By this way, the uplink transmission power for respectively power adjustment zones within a subframe in the first wireless communication system can be derived from the at least one of a structure of a related subframe and uplink scheduling information.

Figure 9:
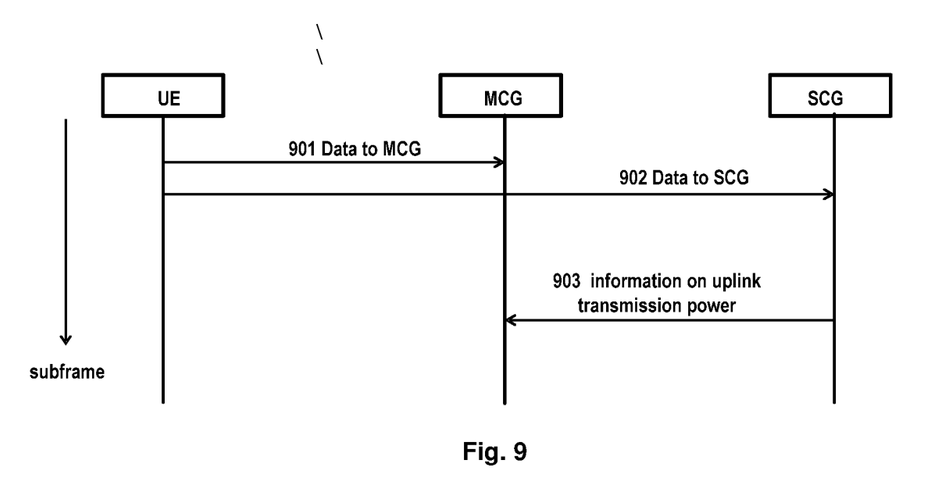
FIG. 9 schematically illustrates a signal flow chart of uplink transmission among a terminal device, MCG and SCG according to an embodiment of the present disclosure.

FIG. 9 illustrates a signal flow chart among a terminal device like UE, MCG (like eNBs in the LTE system), and SCG (like gNBs in the NR system). As illustrated in FIG. 9, in steps 901 and 902, the UE performs power control in respective power adjustment zones within MCG and sends data to the MCG and the SCG, wherein in the MCG, the proposed power control solution is used. In step 903, the SCG may transmit information on power allocation to the MCG. The information on uplink transmission power may include the SCG's subframe structure and/or scheduling information. Thus the MCG can derive the uplink transmission power from the received information. For example, the MCG can learn power allocation difference of each UE among respective power adjustment zones in MCG carriers.

Figure 10:
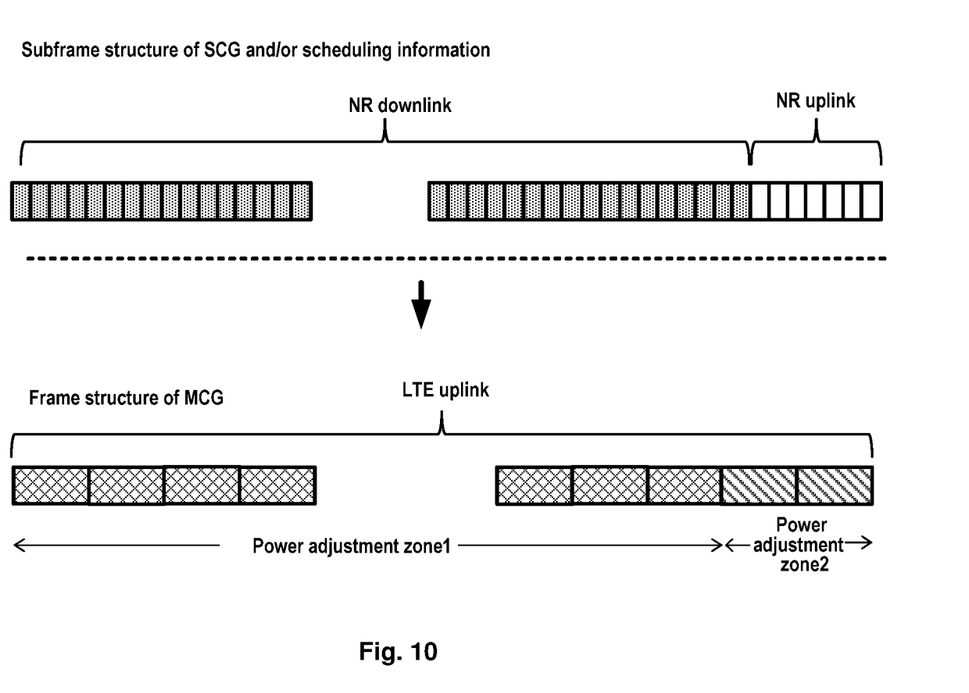
FIG. 10 schematically illustrates a diagram of deriving the information on uplink transmission power at the first wireless communication system according to an embodiment of the present disclosure.

FIG. 10 schematically illustrates a diagram of deriving the information on uplink transmission power at the first wireless communication system like the LTE system according to an embodiment of the present disclosure. As illustrated in FIG. 10, based on the subframe structure of the SCG and/or scheduling information within the SCG, the MCG could learn type of the transmission with a subframe. Based on this information, the MCG could further derive the power adjustment zones in a similar way to the UE and obtain the uplink transmission power within respective power adjustment zones based on the same power determination scheme. For example, the MCG could know that the UE's transmission power for the power adjustment zone 1 is P_max, i.e., the available uplink transmission power for the two systems, while the transmission power for the power adjustment zone 1 is P_max minus the uplink $P_{NR}$ (the guarantee uplink transmission power for the NR system). This information could be used for demodulation in MCG.

Figure 11:
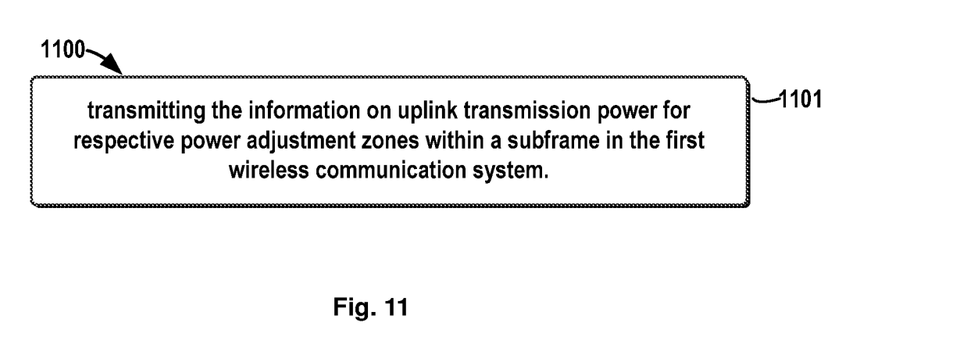
FIG. 11 illustrates a flow chart of uplink transmission power information transmission at the second wireless communication system according to an embodiment of the present disclosure.

FIG. 11 illustrates a flow chart of uplink transmission power information transmission at the second wireless communication system such the NR system according to an embodiment of the present disclosure. As illustrated in FIG. 11, in step 1101, the SCG like gNBs in the NR system transmits, to the first wireless communication system, the information on uplink transmission power for respective power adjustment zones within a subframe in the first wireless communication system. As mentioned before, the information on uplink transmission power may comprise at least one of a structure of a related subframe and uplink scheduling information within the related subframe in the second wireless communication system.

Figure 12:
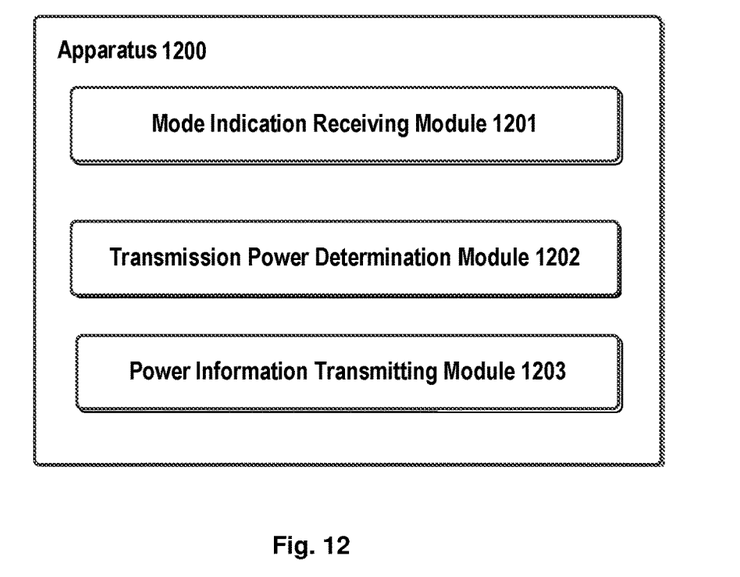
FIG. 12 illustrates an apparatus for uplink power control at a terminal device according to an embodiment of the present disclosure.

FIG. 12 illustrates an apparatus for uplink power control at a terminal device according to an embodiment of the present disclosure. Apparatus 1200 can be implemented at a terminal device such as UE. The terminal device can be connected to both a first wireless communication system and a second wireless communication system.

As illustrated in FIG. 12, apparatus 1200 comprises a transmission power determination module 1201. The transmission power determination module 1201 can be configured to determine uplink transmission power for respective power adjustment zones within a subframe in the first wireless communication system, based on a type of transmission within corresponding parts of a related subframe in the second wireless communication system.

In an embodiment of the present disclosure, the transmission power determination module 1201 can be configured to determine the uplink transmission power for respective power adjustment zones as uplink transmission power available for the first wireless communication system and the second wireless communication system, if there is no uplink transmission within corresponding parts of the related subframe in the second wireless communication system.

In another embodiment of the present disclosure, the transmission power determination module 1201 can be configured to determine the uplink transmission power for respective power adjustment zones in response to a change of the type of transmission within corresponding parts of the related subframe in the second wireless communication system.

In a further embodiment of the present disclosure, the type of transmission within corresponding parts of the related subframe in the second wireless communication system can be obtained at a slot or symbol end boundary within the related subframe in the second wireless communication system.

In a yet further embodiment of the present disclosure, the type of transmission within corresponding parts of a related subframe in the second wireless communication system can be obtained from at least one of structure of the related subframe and scheduling information for the terminal device within the related subframe in the second wireless communication system.

In another embodiment of the present disclosure, the apparatus 1200 further comprises a power information transmission module 1202. The power information transmission module 1202 can be configured to transmit information on uplink transmission power for respectively power adjustment zones within the subframe.

In another embodiment of the present disclosure, the apparatus 1200 further comprises a mode indication module 1203. The mode indication module 1203 can be further configured to receive an indication on an enhanced power control mode, wherein the apparatus 1200 is enabled in response to receipt of the indication on an enhanced power control mode.

Figure 13:
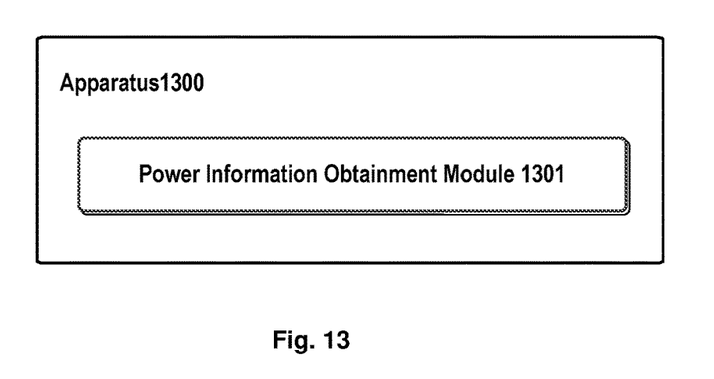
FIG. 13 illustrates an apparatus for uplink receiving at a first wireless communication system according to an embodiment of the present disclosure.

FIG. 13 illustrates an apparatus for uplink receiving at a first wireless communication system according to an embodiment of the present disclosure. A terminal device to be severed is connected to both the first wireless communication system like LTE system and a second wireless communication system like NR system.

As illustrated in FIG. 13, apparatus 1300 includes a power information obtainment module 1301. The power information obtainment module 1301 can be configured to obtain information on uplink transmission power for respectively power adjustment zones within a subframe in the first wireless communication system, to receive uplink signals within the subframe using power indicated by the information on uplink transmission power.

In an embodiment of the present disclosure, the information on uplink transmission power is received from the terminal device.

In another embodiment of the present disclosure, the information on uplink transmission power is received from the second wireless communication system and comprises at least one of a structure of a related subframe and uplink scheduling information within the related subframe in the second wireless communication system.

Figure 14:
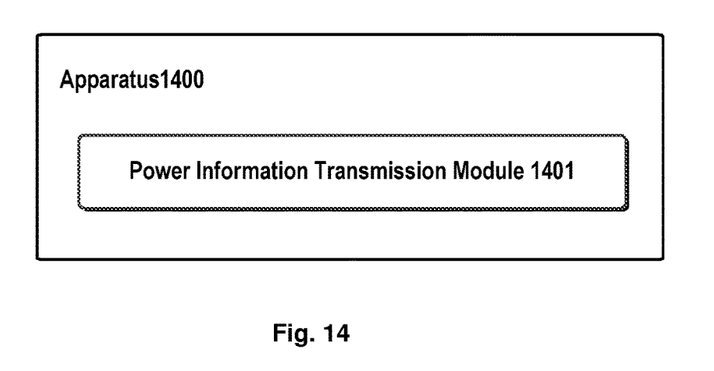
FIG. 14 illustrates an apparatus for transmitting uplink transmission power information at a second wireless communication system according to an embodiment of the present disclosure.

FIG. 14 illustrates an apparatus for transmitting uplink transmission power information at a second wireless communication system according to an embodiment of the present disclosure. A terminal device to be severed is connected to both a first wireless communication system like LTE system and the second wireless communication system like the NR system.

As illustrated in FIG. 14, apparatus 1400 may include a power information transmission module 1401. The power information transmission module 1401 can be configured to transmit the information on uplink transmission power for respective power adjustment zones within a subframe in the first wireless communication system.

In an embodiment of the present disclosure, the information on uplink transmission power may comprise at least one of a structure of a related subframe and uplink scheduling information within the related subframe in the second wireless communication system.

Hereinbefore, the apparatuses 1200, 1300 and 1400 are described with reference to FIGS. 12, 13 and 14 in brief. It is noted that the apparatuses 1200, 1300 and 1400 may be configured to implement functionalities as described with reference to FIGS. 5 to 11. Therefore, for details about the operations of modules in these apparatuses, one may refer to those descriptions made with respect to the respective steps of the methods with reference to FIGS. 5 to 11.

It is further noted that components of the apparatuses 1200, 1300 and 1400 may be embodied in hardware, software, firmware, and/or any combination thereof. For example, the components of apparatuses 1200, 1300 and 1400 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 1200, 1300 and 1400 may comprise at least one processor. The at least one processor suitable for use with embodiments of the present disclosure may include, by way of example, both general and special purpose processors already known or developed in the future. Apparatuses 1200, 1300 and 1400 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1200, 1300 and 1400 to at least perform operations according to the method as discussed with reference to FIGS. 5 to 11 respectively.

Figure 15:
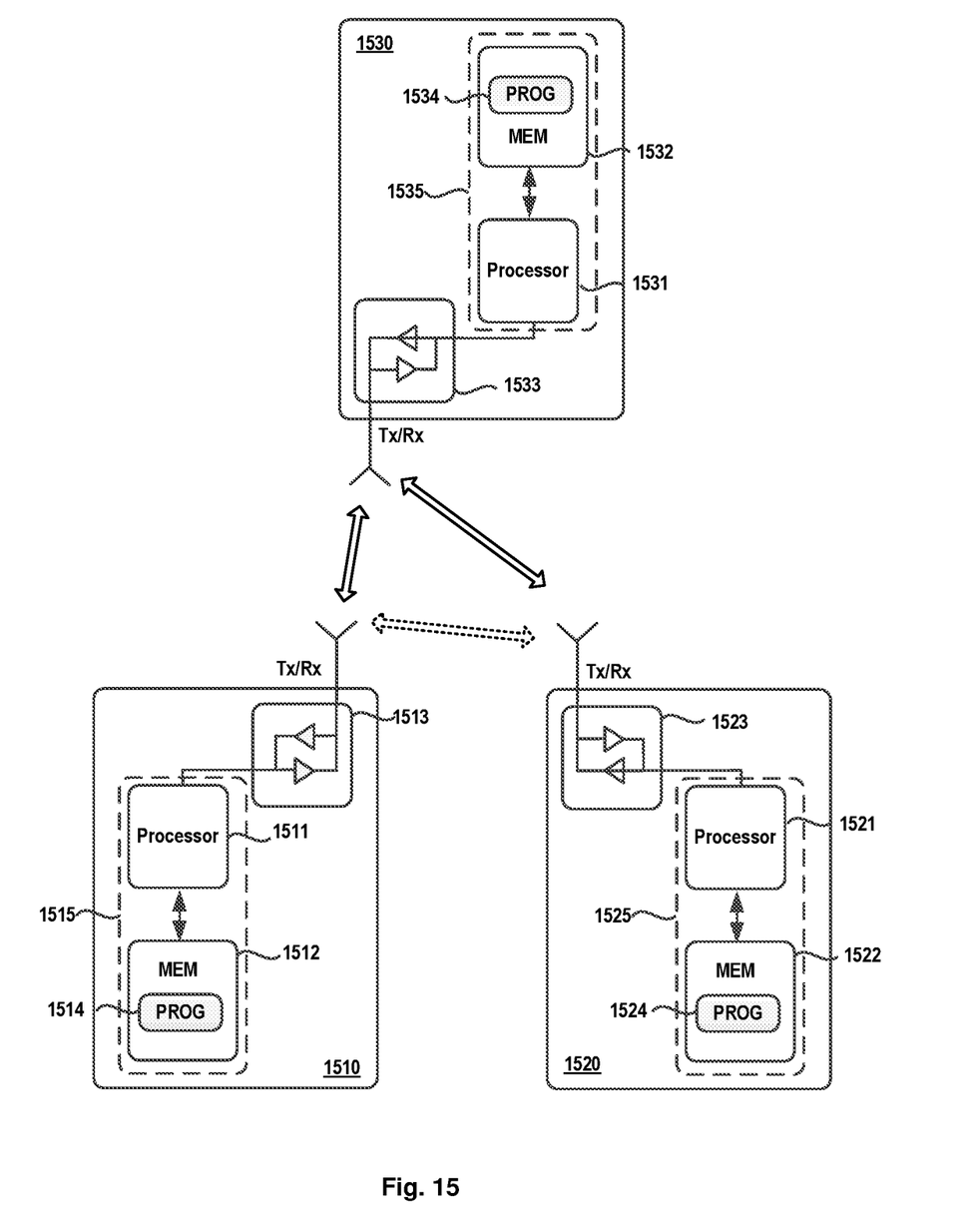
FIG. 15 further illustrates a simplified block diagram of an apparatus 1510 that may be embodied as or comprised in a network node (like eNB) in a first wireless communication network, an apparatus 1520 that may be embodied as or comprised in a network node (like gNB) in a second wireless communication network, and an apparatus 1530 that may be embodied as or comprised in a terminal device like UE as described herein.

FIG. 15 further illustrates a simplified block diagram of an apparatus 1510 that may be embodied as or comprised in a network node (like eNB) in a first wireless communication network, an apparatus 1520 that may be embodied as or comprised in another network node (like gNB) in a second wireless communication network, and an apparatus 1530 that may be embodied as or comprised in a terminal device like UE as described herein.

The apparatus 1510 comprises at least one processor 1511, such as a data processor (DP) and at least one memory (MEM) 1512 coupled to the processor 1511. The apparatus 1510 may further comprise a transmitter TX and receiver RX 1513 coupled to the processor 1511, which may be operable to communicatively connect to the apparatus 1520. The MEM 1512 stores a program (PROG) 1514. The PROG 1514 may include instructions that, when executed on the associated processor 1511, enable the apparatus 1510 to operate in accordance with embodiments of the present disclosure, for example the method 800. A combination of the at least one processor 1511 and the at least one MEM 1512 may form processing means 1515 adapted to implement various embodiments of the present disclosure.

The apparatus 1520 comprises at least one processor 1521, such as a DP, and at least one MEM 1522 coupled to the processor 1521. The apparatus 1520 may further comprise a suitable TX/RX 1523 coupled to the processor 1521, which may be operable for wireless communication with the apparatus 1520. The MEM 1522 stores a PROG 1524. The PROG 1524 may include instructions that, when executed on the associated processor 1521, enable the apparatus 1520 to operate in accordance with the embodiments of the present disclosure, for example to perform the method 1100. A combination of the at least one processor 1521 and the at least one MEM 1522 may form processing means 1525 adapted to implement various embodiments of the present disclosure.

The apparatus 1530 comprises at least one processor 1531, such as a DP, and at least one MEM 1532 coupled to the processor 1531. The apparatus 1530 may further comprise a suitable TX/RX 1533 coupled to the processor 1531, which may be operable for wireless communication with the apparatus 1510. The MEM 1532 stores a PROG 1534. The PROG 1534 may include instructions that, when executed on the associated processor 1531, enable the apparatus 1530 to operate in accordance with the embodiments of the present disclosure, for example to perform the method 500. A combination of the at least one processor 1531 and the at least one MEM 1532 may form processing means 1535 adapted to implement various embodiments of the present disclosure.

Various embodiments of the present disclosure may be implemented by computer program executable by one or more of the processors 1511, 1521, 1531, software, firmware, hardware or in a combination thereof.

The MEMs 1512, 1522, 1532 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1511, 1521, and 1531 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A terminal comprising:
   a processor configured to:
      connect to a E-UTRA (Evolved Universal Terrestrial Radio Access) system and a NR (New Radio) system; and
      determine transmission power within an uplink subframe of the E-UTRA system using a maximum transmission power for the E-UTRA system if uplink symbol(s) within a subframe of the NR system overlap with the uplink subframe of the E-UTRA system, or determine the transmission power using a total transmission power at the terminal if no uplink symbol(s) within the subframe of the NR system overlap with the uplink subframe of the E-UTRA system,
      wherein the subframe of the NR system comprises downlink symbol(s) as well as the uplink symbol(s), the downlink symbol(s) and the uplink symbol(s) of the subframe of the NR system not overlapping with each other in time domain.

2. The terminal according to claim 1, wherein whether symbol(s) within the subframe of the NR system are indicated as uplink is indicated by RRC signaling.

3. A method comprising:
   connecting to a E-UTRA (Evolved Universal Terrestrial Radio Access) system and a NR (New Radio) system; and
   determining transmission power within an uplink subframe of the E-UTRA system using a maximum transmission power for the E-UTRA system if uplink symbol(s) within a subframe of the NR system overlap with the uplink subframe of the E-UTRA system, or determining the transmission power using a total transmission power at a terminal if no uplink symbol(s) within the subframe of the NR system overlap with the uplink subframe of the E-UTRA system, wherein the subframe of the NR system comprises downlink symbol(s) as well as the uplink symbol(s), the downlink symbol(s) and the uplink symbol(s) of the subframe of the NR system not overlapping with each other in time domain.

4. The method according to claim 3, wherein whether symbol(s) within the subframe of the NR system are indicated as uplink is indicated by RRC signaling.

* * * * *